United States Patent [19]

Mate

[11] 4,238,965
[45] Dec. 16, 1980

[54] TWO WIRE FLOW RATE TRANSMITTER

[75] Inventor: David J. Mate, San Diego, Calif.

[73] Assignee: Action Instruments Company, Inc., San Diego, Calif.

[21] Appl. No.: 942,610

[22] Filed: Sep. 15, 1978

[51] Int. Cl.³ .............................................. G01F 1/38
[52] U.S. Cl. .................. 73/861.48; 364/510; 364/814
[58] Field of Search ...................... 73/205 R; 324/132; 328/144, 1; 364/510, 573, 814

[56] References Cited

U.S. PATENT DOCUMENTS

| | | | |
|---|---|---|---|
| 3,078,713 | 2/1963 | Schlieder | 73/205 R |
| 3,097,527 | 7/1963 | Davis et al. | 364/510 X |
| 3,328,569 | 6/1967 | Brewster | 364/814 |
| 3,713,337 | 1/1973 | Stroman | 73/205 R |
| 3,732,406 | 5/1973 | Schlatter | 364/814 |
| 3,934,127 | 1/1976 | Schlatter et al. | 364/510 |
| 3,965,344 | 6/1976 | Romo | 364/814 |

*Primary Examiner*—Daniel M. Yasich
*Attorney, Agent, or Firm*—Brown & Martin

[57] ABSTRACT

The disclosed transmitter operates in a two wire process control system to modify a loop current through the two wires that are representative of pressure drop through an orifice into a second loop current through the two wires that are representative of flow rate through the orifice. To accomplish this, the transmitter generates a first voltage that is representative of the first loop current. Then, it generates a second voltage proportional to the square root of the first voltage, and generates a third voltage proportional to the difference between the first and second voltages. The transmitter then sinks an additional current in the two wires proportional to the third voltage. The sum of the first loop current and the additional current equals the second loop current.

10 Claims, 4 Drawing Figures

TWO WIRE FLOW RATE TRANSMITTER

BACKGROUND OF THE INVENTION

This invention relates to two wire transmitters, and more particularly to two wire transmitters for generating a loop current that is representative of flow rate through an orifice. Basically, two wire transmitters operate in a system that include a loop supply voltage, a pair of wires extending from the loop supply to some location remote from the supply where a measurement is to be made, and the two wire transmitter at the remote location for making the measurement. The loop supply voltage supplies energy to the transmitter; and the transmitter acts as a variable resistance device whose resistance is varied such that the current in the wires is representative of the measurement made.

One common measurement that is made by two wire transmitters in the process control industry is the pressure drop of a fluid in motion through an orifice. Knowing the size of the orifice, and the pressure drop, the flow rate through the orifice may then be calculated. Flow rate is proportional to the square root of the pressure drop. Currently, two wire transmitters are available to measure this pressure drop and transmit a current in the loop proportional to the drop. However, no devices are available which generate a loop current that is directly proportional to the flow rate.

Thus, it is desirable to have a device which can be added to an existing two wire system that measures pressure drop which will modify the loop current such that it is proportional to a corresponding flow rate. Further, it is desirable for the modified loop current to have the same minimum value and the same maximum value as original loop current. This is because, in the two wire transmitter industry, standards exist for the end points of the loop current. One widely followed standard is that the loop current vary between 4 milliamps and 20 milliamps. These standard end points must be made to correspond to a minimum flow rate and a maximum flow rate in order for other equipment in the loop, such as recorders, to properly operate.

In addition, it is necessary for the device to draw only a small amount of power from the loop. This is because in general, the loop supply voltage must be relatively small for safety reasons. Typically, the loop supply is only 24 volts. And this voltage is partially dropped across the pressure transmitter, and partially dropped across other devices such as recorders or alarms which may be in the loop. Thus, the voltage which remains to be dropped across the disclosed device typically is only on the order of 5 to 10 volts. Further, the minimum loop current using the above described industry standard is only 4 milliamps. Therefore, only several milliwatts of power are available to energize the disclosed device.

Therefore, it is one object of the invention to provide apparatus for modifying a loop current in a two wire transmitter system that is representative of pressure drop through an orifice into a loop current that is representative of slow rate through the orifice.

Another object of the invention is to provide apparatus for modifying a loop current representative of the pressure drop to a loop current representative of flow rate wherein both loop currents have identical end points.

SUMMARY OF THE INVENTION

These and other objects are accomplished in accordance with the invention by apparatus which operates in conjunction with a two wire transmitter system that generates a first loop current representative of pressure drop through an orifice. The apparatus includes a sensing circuit which generates a first voltage representative of this first loop current. The apparatus also includes a square root circuit which generates a second voltage proportional to the square root of the first voltage, and further includes a difference amplifier that generates a third voltage proportional to the difference between the first and second voltages. A variable resistance device is included for coupling between the two wires of the transmitter system. The resistance of this device is varied in accordance with the third voltage such that an additional current is made to flow in the loop proportional to the third voltage. This additional current plus the first loop current form a second loop current that is representative of flow rate through the orifice.

BRIEF DESCRIPTION OF THE DRAWINGS

The details of this disclosure can best be understood by reference to the following drawings as they are referred to in the detailed description where.

DETAILED DESCRIPTION

Figure 1:
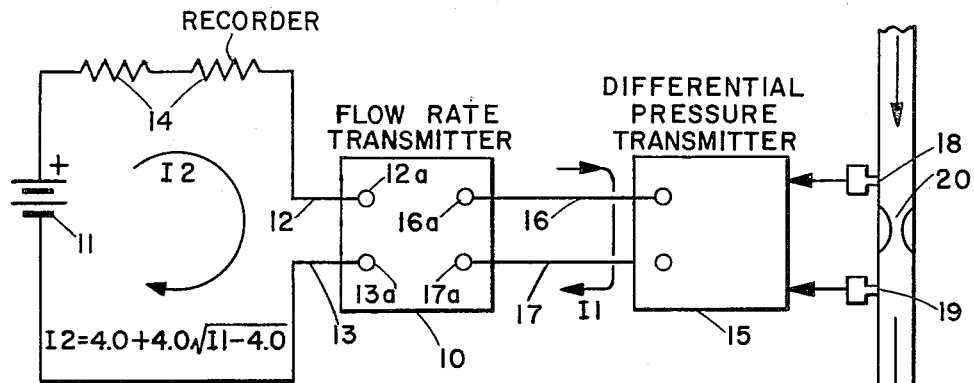
FIG. 1 is a diagram of a two wire transmitter system that includes the disclosed device.

A two wire transmitter system which incorporate the disclosed flow rate transmitter 10 is illustrated in FIG. 1. This system includes a loop voltage supply 11 that energizes the loop. A pair of leads 12 and 13 couple supply 11 to terminals 12a and 13a on transmitter 10. Various other resistive devices 14, such as recorders of the loop current $I_2$, may also be serially coupled between supply 11 and transmitter 10.

Also included in the system is a differential pressure transmitter 15. A pair of leads 16 and 17 interconnect transmitter 15 to terminals 16a and 17a on transmitter 10. In operation, transmitter 15 measures the difference in pressure between the input 18 and output 19 of an orifice 20. This measured pressure difference is indicated by a current $I_1$ that flows from lead 16 through transmitter 15 to lead 17. That is, transmitter 15 operates as a variable current sink wherein the amount of current sinked represents the measured pressure difference.

Transmitter 10 operates to combine the loop current $I_1$ with an additional current to form loop current $I_2$. Current $I_2$ is representative of the flow rate through orifice 20. This flow rate is proportional to the square root of the pressure difference across the orifice. Thus, current $I_2$ is representative of the square root of current $I_1$.

In addition, current $I_2$ has the same minimum value and same maximum value as current $I_1$. This allows various devices in the loop which expect the loop current to stay within predefined limits to operate properly. In one preferred embodiment, loop currents $I_1$ and $I_2$ both vary between a minimum of 4 milliamps and a maximum of 20 milliamps. In this embodiment, transmitter 10 operates to generate a loop current $I_2$ equal to $4.0+4.0\sqrt{I_1-4.0}$.

Figure 2:
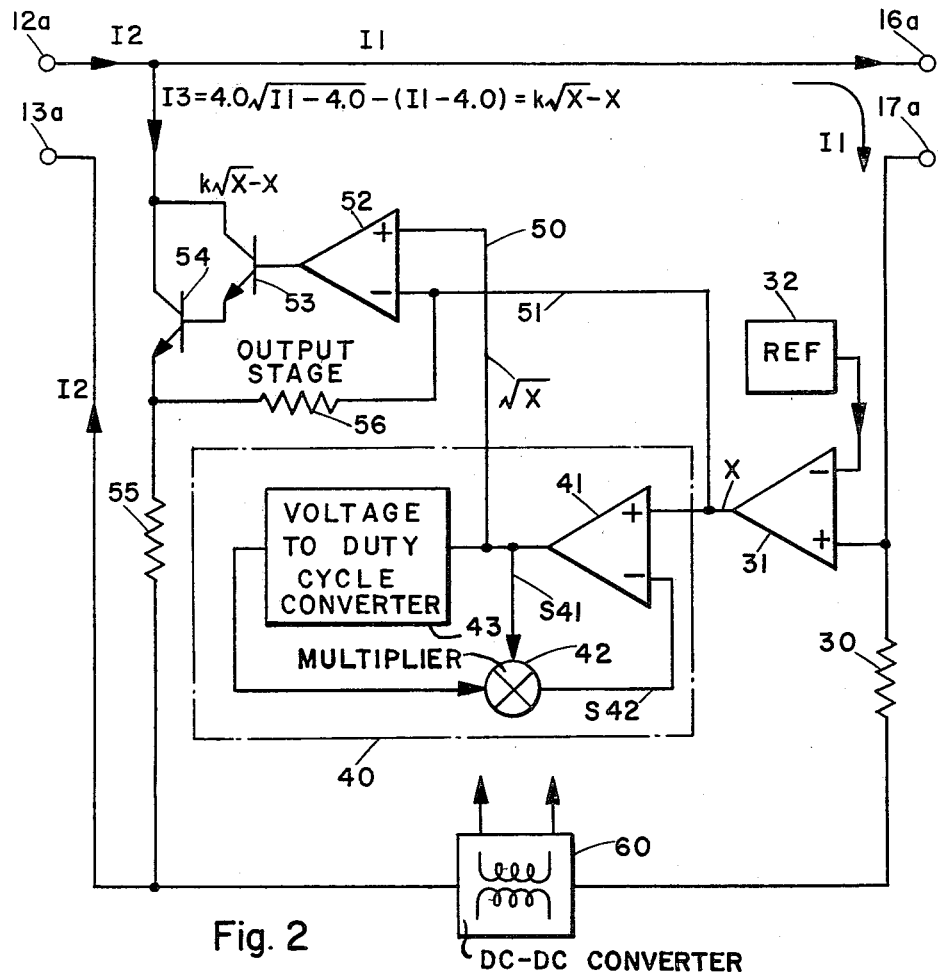
FIG. 2 is a block diagram of the disclosed device.

Referring now to FIG. 2, a block diagram of a preferred embodiment for flow rate transmitter 10 will be described. Reference numerals 12a, 13a, 16a, and 17a represent the input and output terminals of this device. Current $I_1$ flows from terminal 12a to terminals 16a. Then it flows from terminal 17a to terminal 13a. In this path it flows through a DC-DC converter 60 that powers all of the modules in FIG. 2. Current $I_1$ is generated by operation of pressure transmitter 15.

The disclosed device operates to sense current $I_1$ and in response thereto, to sink a current of $I_3$ from terminal 12a to 13a. The sum of current $I_1$ and current $I_3$ equals loop current $I_2$. In the preferred embodiment current $I_2$ equals $4.0+4.0\sqrt{I_1-4.0}$. Thus, current $I_3$ equals $4.0\sqrt{I_1-4.0}-(I_1-4.0)$. This current causes the loop current $I_2$ to vary between 4 milliamps and 20 milliamps as previously described.

In general, other minimum and maximum values of the current $I_2$ may be achieved by sinking a current between the terminals 12a and 13a that is of the form $k\sqrt{X}-X$. In the above described embodiment, X is equal to $I_1-4.0$. In order to generate this $\sqrt{X}-X$ function, the FIG. 2 apparatus includes a sensing resistor 30, a difference amplifier 31, and a reference voltage 32. The voltage developed across resistor 30 is proportional to current $I_1$. This voltage is fed into a non-inverting input of amplifier 31; while reference voltage 32 is fed into the inverting input of amplifier 31. Signal X is then developed at the amplifiers output.

Signal X is then fed into the input of a square root circuit 40. This circuit includes a difference amplifier 41, a mixer 42, and a voltage to duty cycle converter 43. The output of amplifier 41 connects to the input of converter 43; and an inverting input of amplifier 41 is coupled through mixer 42 to the output of amplifier 41 and to the output of converter 43. By this configuration, a signal proportional to the square root of X is formed at the output of amplifier 41.

The operation of circuit 40 may be understood by first considering that the output signal S42 of mixer 42 has a time average value proportional to signal S41 at the output of amplifier 41 times the duty cycle of the signal produced at the output of circuit 43. This duty cycle by definition is proportional to signal S41. Thus, the output signal of mixer 42 has a time average value proportional to signal S41 squared. In other words, signal S41 is proportional to the square root of the time average value of signal S42.

Now due to the operation of difference amplifier 41, that is due to its gain and feedback, the signal on the inverting input will be forced to equal the signal on the non-inverting input. Thus, the time average value of signal S42 will be forced to equal signal X. And since signal S41 equals the square root of signal S42, it follows that signal S41 also equals the square root of X.

Signals $\sqrt{X}$ and X couple through respective leads 50 and 51 to a difference amplifier 52. Thus, the output of amplifier 52 is a voltage proportional to $\sqrt{X}-X$. This output voltage is fed to the base of a transistor 53, which in turn drives the base of another transistor 54. Basically, transistor 53 and 54 comprise a variable resistance device, and the value of this resistance is controlled by the output voltage $\sqrt{X}-X$.

Transistors 53 and 54 are connected across terminals 12a and 13a; and current $I_3$ flows through them. Current $I_3$ also passes through a resistor 55. There a voltage directly proportional to the current is developed. This voltage is fed back to the inverting input of amplifier 52 through a resistor 56. By this feedback, the current $I_3$ is made proportional to the voltage at the output of amplifier 52. Further, by appropriately choosing the gain of the inputs to amplifier 52 and the reference voltage 32, current $I_3$ is made equal to the previously described mathematical expression of $4.0\sqrt{I_1-4.0}-(I_1-4.0)$.

Figure 3:
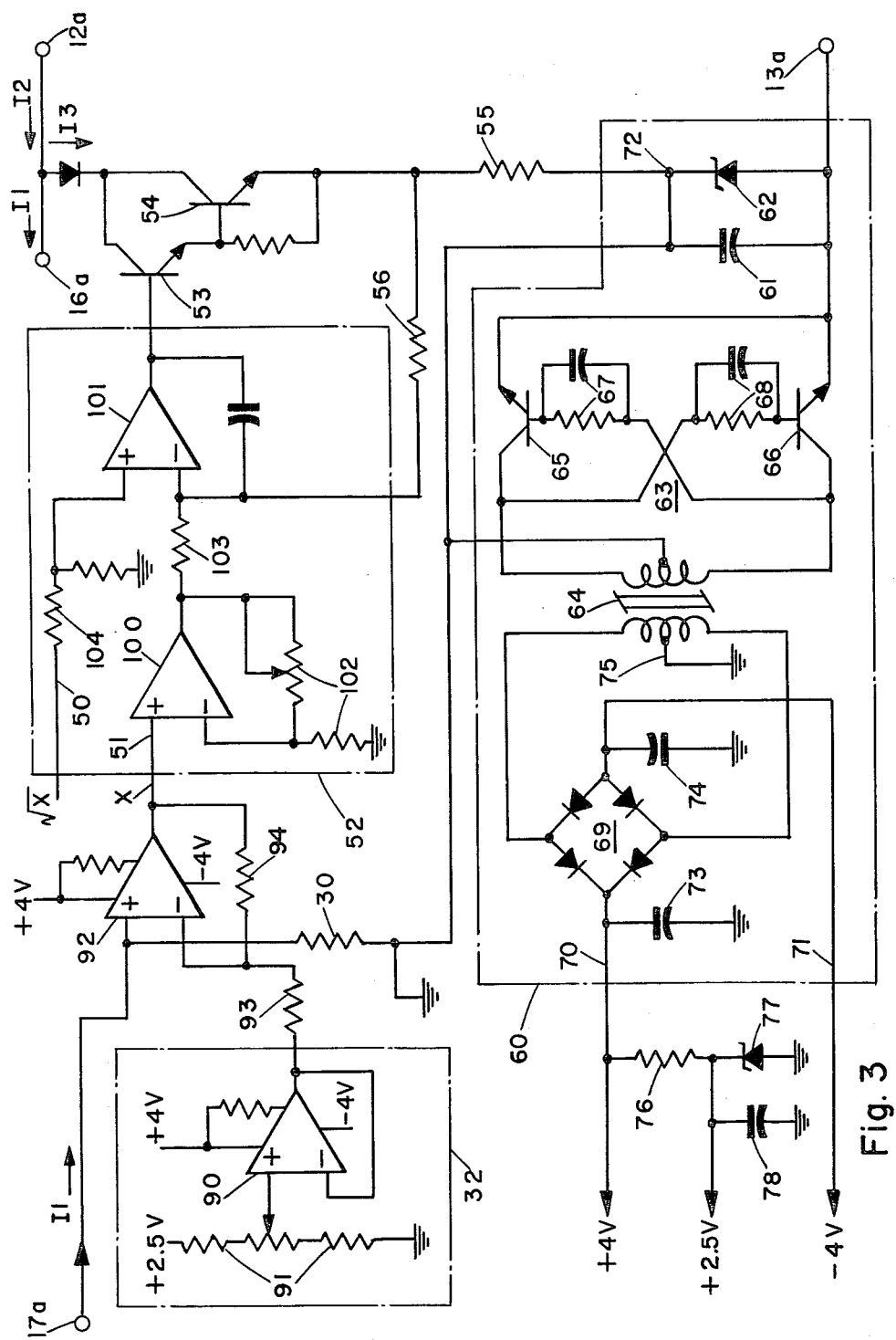
FIG. 3 is a detailed circuit diagram of some of the modules within the device of FIG. 2.
Figure 4:
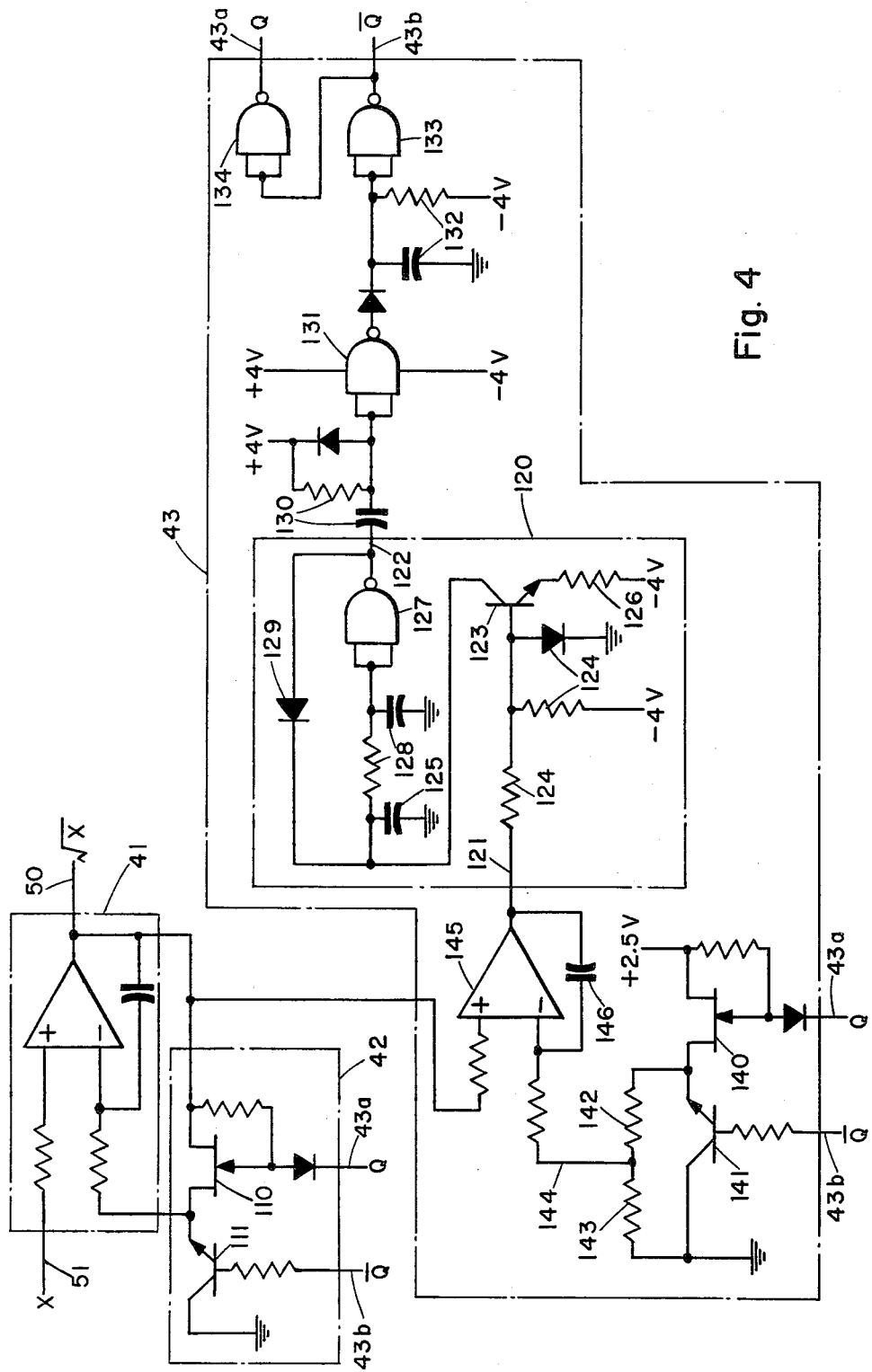
FIG. 4 is a detailed circuit diagram of the remaining modules within the device of FIG. 2.

A preferred detailed circuit for each of the modules in FIG. 2 will now be described in conjunction with FIGS. 3 and 4. FIG. 3 for example, includes a detailed circuit diagram of inverter 60. The input portion of inverter 60 includes a capacitor 61, a zenor diode 62, and oscillator 63, and a transformer 64. Capacitor 61 and diode 62 operate to supply a DC bias voltage to oscillator 63. This is converted by the oscillator into an oscillating signal in the primary winding of transformer 64. A pair of transistors 65 and 66 with positive feedback components 67 and 68 respectively are included within oscillator 63 to generate this oscillating signal.

The output portion of inverter 60 includes four diodes 69 which are configured as a full wave rectifier connected to the secondary winding of transformer 64. Plus four volts is developed at a node 70 of these diodes, while minus four volts is developed at another node 71. These voltages are referenced to a point 72 in the current loop means of components 73, 74, and 75.

As was pointed out earlier in this disclosure, a two wire transmitter must be operable at low input power levels in order to be compatible with certain industry standards. To meet this requirement, conventional off-the-shelf modules cannot merely be substituted to the block diagram in FIG. 2. For example, typical DC-DC converters use at least 100 milliwatts when they are just idling. In comparison, the preferred embodiment of power inverter 60 has a transformer 64 with a core that is specially selected to have no losses. This allows the inverter to operate at a power level of approximately 20 milliwatts. To further minimize consumed power diodes 69 ae germanium diodes rather than the conventionally used silicon diodes. Germanium diodes need only approximately two tenths of a volt before conduction occurs; whereas silicon diodes require approximately six tenths of a volt.

Also illustrated in FIG. 3 is a detailed circuit diagram of the module which forms the previously described variable X. In part, this module includes a difference amplifier 90 and resistor 91. These components are interconnected as illustrated to form reference source 32. The output of the reference source is coupled to an inverter input of a difference amplifier 92 through resistor 93 and 94; while the non-inverting input of amplifier 92 is coupled to receive the voltage from sensing resistor 30. Components 92-94 form the previously described module 41. Signal X is formed at the output of component 92.

Both of the amplifiers 90 and 92 are energized by plus four volts and minus four volts which converter 60 develops. All of the other differential amplifiers in the FIG. 3 circuit and the FIG. 4 circuit are also energized in a similar manner. These power connections, however, are not illustrated in order to simplify the drawing. Further, these amplifiers are specially selected for their low power consumption quality. Suitably a Siliconix L144 chip that contains three operational amplifiers and uses only approximately 1 milliwatt may be used.

Signal X is fed via lead 51 to one input of difference amplifier 52, while signal $\sqrt{X}$ is fed via lead 50 to the other input of amplifier 52. In the illustrated preferred embodiment, amplifier 52 actually is made of a difference amplifier 100 and another difference amplifier 101. Further, amplifier 100 includes a resistor feedback network 102. Due to this feedback, the output of amplifier 100 is approximately equal to 1.1X.

The 1.1X signal is then fed through a resistor 103 to the inverting input of amplifier 101. A signal from $I_3$ current sensing resistor 55 is also sent to this inverting input through resistor 56. Similarly, the signal $\sqrt{X}$ is sent to the non-inverting input of amplifier 101 through a resistor 104. By approximately choosing values for resistor 102, 103, 104, and 55, the value of current $I_3$ may be scaled to lie within the previously described limits of 4 milliamps to 20 milliamps.

Next, referring to FIG. 4 the details of a preferred embodiment of a circuit which receives signal X and develops signal $\sqrt{X}$ will be described. Signal X is received on lead 51 by difference amplifier 41; and the output of the amplifier produces signal $\sqrt{X}$ on lead 50 due to the amplifier's feedback network. This feedback network is comprised of mixer 42, and voltage to duty cycle converter 43.

One of the inputs to mixer 42 is the $\sqrt{X}$ signal on lead 50. The other input to mixer 42 are logic signals Q and $\overline{Q}$ on leads 43a and 91 respectively from circuit 43. Signals Q and $\overline{Q}$ are the complement of each other. When signal Q is high, a transistor 110 turns on and passes the $\sqrt{X}$ signal on lead 50 to an inverting input of amplifier 41. Conversely, when signal $\overline{Q}$ is high, a transistor 111 turns on and connects the inverting input of amplifier 41 to ground. Thus, the signal at the inverting input of amplifier 41 is proportional to the $\sqrt{X}$ signal times the duty cycle of the signal Q.

What remains to be shown is that the duty cycle of signal Q is proportional to the magnitude of the $\sqrt{X}$ signal. To show that this is true, first consider the operation of a circuit 120 within converter 43. Basically, circuit 120 operates as a voltage controlled oscillator. The circuit receives an input signal on a lead 121 and in response thereto produces an output signal on a lead 122 having a frequency proportional to the magnitude of the input signal. To accomplish this function, the signal on lead 121 is passed to the base of a transistor 123 through a biasing network 124. Thus, the degree to which transistor 123 conducts, is proportional to the time average value of the signal on the lead 121.

Transistor 123 is utilized to discharge a capacitor 125 at a variable rate. To this end, the collector of transistor 123 connects to capacitor 125; and the emitter of transistor 123 is coupled to minus 4 volts through a resistor 126. A means for charging capacitor 95 is provided by a logic inverter gate 127. This gate has an input coupled to capacitor 125 through a resistor capacitor combination 128; and has an output coupled to capacitor 125 through a diode 129.

Components 128 provide a predetermined time delay for the voltage on capacitor 125 to reach the input of gate 127. When the input voltage of gate 127 is below the threshold level, the output of gate 127 is at a high logic level which charges capacitor 125 through diode 129. Conversely, when the input voltage of gate 127 is above the threshold level, then the gate output is at a logical low level which prevents further charging of capacitor 125. Then, the variable conductance of transistor 123 discharges the capacitor. Capacitor 95 thus has a fixed charge rate and a variable discharge rate. The discharge rate is proportional to the signal magnitude on lead 121; so therefore, the frequency at which the output of gate 127 switches is proportional to the signal on lead 121.

By operation of the circuitry between lead 122 and lead 43b signal $\overline{Q}$ is made to have a duty cycle proportional to the signal on lead 121. This circuitry includes a resistor capacitor combination 130, and inverting logic gate 131, a resistor capacitor combination 132, and an inverting gate 133. Each time the signal on lead 122 goes low, the voltage to the input of gate 131 also goes low and then slowly charges the plus four volts. This charge time is determined by the RC time constant of components 130. The output of gate 131 will be at a high logic level from the time that the signal on lead 122 goes low until the time that the input to gate 131 charges to the threshold level of the gate. Thus, in response to the signal on lead 122 going low, a positive pulse is generated at the output of gate 131. This pulse has a width proportional to the RC time constant of components 130 and the low to high threshold voltage of gate 131.

A high level at the output of gate 131 is transferred immediately to the input of gate 133. Conversely, a low level at the output of gate 131 is transferred to the input of gate 133 only after a time delay determined by the RC time constant of components 132. That is, a high to low transition at the output of gate 131 produces a slowly decaying signal at the input of gate 133. When this decaying signal reaches the high to low threshold voltage of gate 133, the output of gate 133 switches to a high level.

From the above, it is clear that the width of the negative pulse at the output of gate 133 is dependent upon the RC time constant of components 130 and 131. Further, it is dependent on the low to high threshold voltage of gate 131, and the high to low threshold voltage to gate 133. These two thresholds will vary with temperature. However, as one threshold increases, the other threshold decreases. And thus, the overall effect is that any threshold variations in gates 131 and 133 cancel out. Therefore, the negative output pulse from gate 133 that is generated in response to a high to low transition on lead 122 is of a constant value. Further, the time between high to low transitions on lead 122 is directly proportional to a voltage on lead 121. Therefore, signal $\overline{Q}$ has a duty cycle that is directly proportional to the voltage on lead 121.

Signal $\overline{Q}$ from gate 133 is fed through an inverter 134 to form signal Q. Signal Q in turn couples to the base of a transistor 140; and signal $\overline{Q}$ couples to base of another transistor 141. These two transistors are inter-coupled between a reference voltage of 2.5 volts and ground as illustrated. Transistor 140 turns on in response to a high Q signal and passes current through a pair of resistors 142 and 143. This current develops a voltage on a lead 124 that is proportional to 2.5 volts. Conversely, a high $\overline{Q}$ signal turns on transistor 121 which forces the voltage on lead 144 to ground. Thus, the average voltage on lead 144 is proportional to the duty cycle of the Q and $\overline{Q}$ signal.

Lead 144 couples to the inverting input of an amplifier 145. The non-inverting input of this amplifier is coupled to receive a signal on lead 50. This amplifier also has a feedback capacitor 146 which couples its output back to its inverting input. Due to the high gain of amplifier 125 and its feedback, the signal at the inverting and non-inverting inputs will be forced to equal each other. Therefore, the signals Q and $\overline{Q}$ will have a duty cycle proportional to the signal on lead 50. This of course was the desired result.

A preferred embodiment of the invention has now been described in detail. In addition, many changes and modifications may be made to these details without departing from the nature and spirit of the invention. Therefore, it is to be understood that the invention is not limited to said details but is defined by the appended claims.

I claim:

1. A flow rate transmitter for use in a two wire transmitter system that includes a differential pressure transmitter, a DC voltage supply, and a pair of wires connecting said voltage supply across said differential pressure transmitter said differential pressure transmitter being operable to pass a DC loop current $I_1$ through said wires representative of a pressure drop through an orifice; said flow rate transmitter being comprised of:

current sensing means having terminals which connect in series with said wires for passing said loop current $I_1$ and generating a first voltage representative thereof;

means for generating a second voltage proportional to the square root of said first voltage;

means for generating a third voltage proportional to said second voltage minus said first voltage;

voltage controller variable resistance means having terminals which connect in parallel with said pair of wires for passing a DC current $I_3$ therebetween proportional to said third voltage wherein the sum $I_1 + I_3$ is representative of flow rate through said orifice; and DC-DC voltage converter means having terminals which connect in series with said wires for passing current I, and for drawing power therefrom to energize all said means in said flow rate transmitter.

2. A flow rate transmitter according to claim 1 wherein said loop current I, varies within predetermined limits, and wherein said current sum $I_1 + I_3$ varies within those same limits.

3. Apparatus according to claim 2 wherein said means for generating a first voltage generates said first voltage proportional to said loop current $I_1$ minus a predetermined constant.

4. Apparatus according to claim 3 wherein said means for sinking an additional current sinks a current equal to $4.0\sqrt{I_1-4.0}-(I_1-4.0)$ where $I_1$ is said first loop current in milliamps.

5. Apparatus according to claim 1 wherein said means for generating a second voltage includes a differential amplifier means, mixer means, and voltage to duty cycle converter means; with said amplifier means having an output coupled to an input on said converter means, and said amplifier also having an inverting input coupled through said mixer means to said amplifier output and to an input on said converter means.

6. Apparatus according to claim 5 wherein said voltage to duty cycle converter means includes a first logic gate for detecting a threshold level in a rising signal coupled to a second logic gate for detecting a threshold level in a falling signal to form said duty cycle output of said voltage to duty cycle converter.

7. In a two wire transmitter system that includes a differential pressure transmitter, a DC voltage supply, and a pair of wires connecting said voltage supply across said differential pressure transmitter, said differential pressure transmitter being operable to pass a DC loop current $I_1$ through said wires representative of a pressure drop through an orifice; a method of measuring flow rate through said orifice including the steps of;

passing said loop current $I_1$ through a current sensing means having terminals in series with said wires and generating a first voltage representative thereof;

generating a second voltage proportional to the square root of said first voltage;

generating a third voltage proportional to the difference between said first and second voltage; p1 passing a DC current $I_3$ proportional to said third voltage through a variable resistance means in parallel with said pair of wires, wherein the sum $I_1 + I_3$ is representative of flow rate through said orifice; and performing all of said steps via electronic circuits which are powered via DC-DC voltage converter means having terminals in series with said wires for drawing power therefrom.

8. A method according to claim 7 wherein said loop current $I_1$ and said sum current $I_1 + I_3$ have identical minimum and maximum values.

9. A method according to claim 8 wherein said first voltage is proportional to said first loop current minus a predetermined constant.

10. A method according to claim 9 wherein said current $I_3$ equals $4.0\sqrt{I_1-4.0}-(I_1-4.0)$ wherein $I_1$ is in milliamps.

* * * * *